(12) United States Patent
Lederbauer

(10) Patent No.: US 6,257,113 B1
(45) Date of Patent: Jul. 10, 2001

(54) APPARATUS FOR MANUFACTURING TIRE SECTORS, INTERCONNECTED IN THE AREA OF THE TIRE CAP FROM A TIRE

(76) Inventor: Wolfgang Lederbauer, Dominikanerbastei 6, 1010 Vienna (AT)

( * ) Notice: Subject to any disclaimer, the term of this patent is extended or adjusted under 35 U.S.C. 154(b) by 0 days.

(21) Appl. No.: 08/633,761

(22) PCT Filed: Oct. 24, 1994

(86) PCT No.: PCT/AT94/00156

§ 371 Date: Jun. 18, 1996

§ 102(e) Date: Jun. 18, 1996

(87) PCT Pub. No.: WO95/11784

PCT Pub. Date: May 4, 1995

(30) Foreign Application Priority Data

Oct. 25, 1993 (AT) ........................................ 2153/93

(51) Int. Cl.[7] .............. B26D 1/06; B26D 5/22; B02C 18/04
(52) U.S. Cl. ................. 83/620; 83/951; 83/923; 83/639.1; 83/648; 83/694; 83/202; 83/468.1; 83/829
(58) Field of Search .................. 83/951, 614, 923, 83/618, 620, 622, 636, 637, 639.1, 640, 829, 648, 694, 202, 213, 467.1, 468.1

(56) References Cited

U.S. PATENT DOCUMENTS

| | | | |
|---|---|---|---|
| 3,911,772 | * | 10/1975 | Kisielewski ........................ 83/513 |
| 4,338,839 | * | 7/1982 | Farrell, Sr. et al. ................ 83/622 |
| 4,338,840 | * | 7/1982 | Farrell, Sr. et al. ................ 83/620 |
| 4,694,716 | * | 9/1987 | Sakamoto ...................... 83/639.1 X |
| 4,873,759 | * | 10/1989 | Burch ........................... 83/639.1 X |
| 5,133,236 | * | 7/1992 | Dudley .......................... 83/639.1 X |
| 5,235,888 | * | 8/1993 | Dom ............................. 83/425.2 X |
| 5,246,754 | | 9/1993 | Miller . |
| 5,267,496 | * | 12/1993 | Roach et al. ................... 83/639.1 X |
| 5,551,325 | * | 9/1996 | Schutt ............................ 83/951 X |
| 5,601,004 | * | 2/1997 | Queen ............................ 83/951 X |

FOREIGN PATENT DOCUMENTS

| | | |
|---|---|---|
| A 25 31 923 | 2/1977 | (DE) . |
| 2939849 | * 4/1981 | (DE) ............................ 83/951 |
| A 39 36 083 | 5/1991 | (DE) . |
| A 41 12 167 | 10/1992 | (DE) . |
| A 2 631 563 | 11/1989 | (FR) . |
| A 2 674 473 | 10/1992 | (FR) . |
| A 379 302 | 9/1932 | (GB) . |
| A 2 181 085 | 4/1987 | (GB) . |

* cited by examiner

*Primary Examiner*—Boyer Ashley
(74) *Attorney, Agent, or Firm*—Henry M. Feiereisen; Ursula B. Day

(57) ABSTRACT

An apparatus for the production of tire sectors from used tires wherein the tire sectors remain interconnected in the area of the tire tread. The apparatus comprises a support with at least a portion inserted within the inner section of the tire and the support has at least two spaced apart and arc-shaped abutments for supporting the tire sidewalls. At least one knife for cutting the sidewalls of the tire without cutting the tread, wherein the abutments have multiple passageways to allow the knife to move through the abutments during a cutting operation when the knife moves from a mid position to an end position. The apparatus can include punching dies for punching openings into the tire sidewalls.

20 Claims, 7 Drawing Sheets

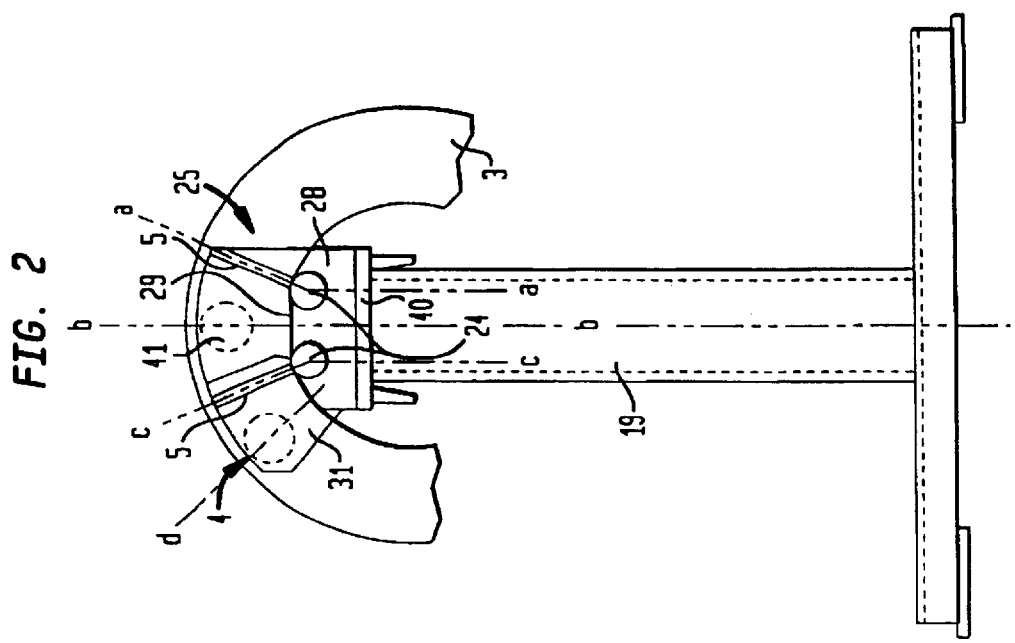
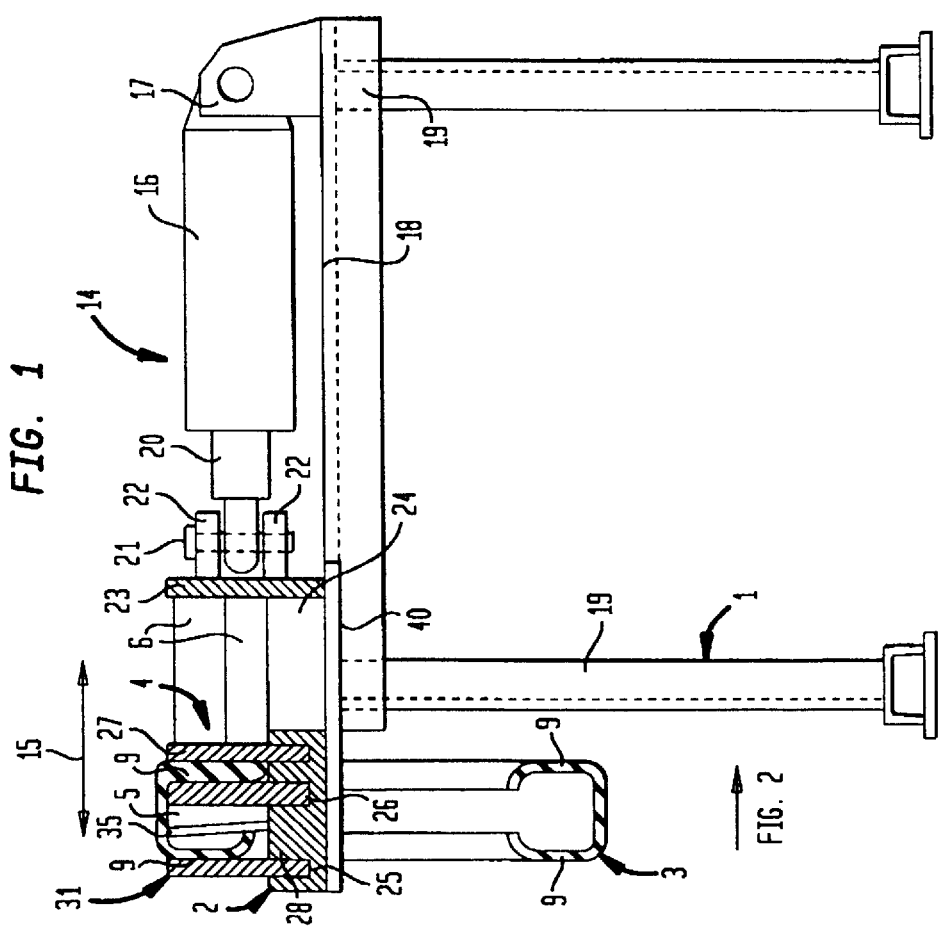

APPARATUS FOR MANUFACTURING TIRE SECTORS, INTERCONNECTED IN THE AREA OF THE TIRE CAP FROM A TIRE

BACKGROUND OF THE INVENTION

The invention relates to an apparatus for manufacturing tire sectors from a tire, in particular from used tires where the tire is cut in such a way that the sectors remain connected at the area of the tire tread, whereby the sectors are made by producing at least one cut extending from the tire opening in both side walls in direction towards the tire tread and terminating just shy of the surface of the tire tread. If desired, the tire sectors may be provided with holes in the side walls.

Such connected tire sectors are used for the production of structures where greenery is desired, in particular for use as borders of roadways, parking lots, but also for front parts of already existing walls for use as sound barriers. To this end, the slotted tires are cut entirely through at one point, so that the tire sectors which are connected at the tread are extended and ready for mounting in a strip like manner on a supporting stand. Greenery is able to grow through the spaces remaining between the individual extended tires and is protected by the tire material against water splashes and wind, but can be reached by rain and by an additional sprinkling as desired, so that the greenery can grow quickly and permanently. Such structures have been proven to be very good and are used more and more in a variety of applications. Up to now, however, it was comparatively troublesome to process the tires in the above described manner, because the tire material is of high resistance and, in addition, as a rule is provided with inserts in the area of the beaded edge of the side walls. Until now, these materials had to be sawed by hand in order to obtain the said cuts. This work was troublesome and time consuming, resulting in the desire to automate such cuts.

SUMMARY OF THE INVENTION

It is an object of the present invention to provide an improved apparatus for manufacturing tire sections, obviating the afore-stated drawbacks.

The present invention meets this demand and solves this object by using a stand designed for the tire, providing a support for mounting the tire and which is provided with at least two abutments for supporting the side walls during the cutting operation. The abutments are disposed laterally in relation to the side walls in the working position of the tire, and that the stand has a guide mechanism for at least one cutting knife, the cutting knife or the cutting knives being provided with cutting edges for effecting the cuts in the two side walls, each cutting knife being connected to a drive system for movement along the guide mechanism. Each cutting knife is moved by the drive system along the guide mechanism in direction towards an abutment; a side wall of the tire to be provided with the cuts being disposed between the cutting edge of the cutting knife and the abutment. The cutting knife cuts this side wall from the area of the bead up to the area of the tread, but does not however reach the surface thereof, so that this cutting does not completely cut the tire into two pieces at this location. Optionally, a cutting knife for cutting the other side wall is provided, or one single cutting knife may cut the two side walls.

A preferred embodiment of the invention provides that one cutting knife is provided for one cut respectively in each of the two side walls, which cutting knife at two opposing edges carries opposed cutting blades. This cutting knife in its starting position is disposed between the two side walls, whereby one abutment respectively is disposed laterally at the outside of each side wall. The cutting knife first cuts one side wall by movement in one direction, is then retracted, and then moved beyond the starting position to such an extent that the other side wall is also cut. The two cuts of the tire are in a common plane, but not necessarily so, as the described manner of operation can also be done by using two separate knives, whereby the cutting edges are not located in a common plane, but are staggered with respect to each other when seen from the perspective of the peripheral direction of the tire, particularly preferred is also that in addition to the said cuts, other openings are cut in the area of the side wall, since it has been shown that such openings favor the growth of greenery through these openings. Heretofore, such openings had to be punched by hand or by means of punch presses which proved to be troublesome and time consuming.

In a preferred development of the invention, for cutting at least one opening in the area of the side wall, guide means for at least one punching die is also provided in the stand, which punching die can be activated by a drive means along the guide mechanism. Such a punching die, as discussed above with respect to the cutting edges, is common in that, a single punching die may work on both side walls for the cutting of openings. As a rule, however, one opening in one of the two side walls are sufficient, and one single opening per tire sector is enough. Numerous embodiments are possible, in which a plurality of openings per tire sector are cut, and these openings can be distributed over the two side walls in any desired manner. For example, in cases, where noise absorption is especially desired, it is particularly favorable to provide those side walls in the position of the cut tire mounted on the structure and facing the noise source, with a plurality of small openings forming hollow spaces for the absorption of sound waves.

Number, size and cross sectional shape of the openings can be selected according to choice. Of course, the circular shape is the simplest and most frequently used one, however, any desired special shape can be obtained by choosing the suitable cross sectional shapes of the punching dies and, respectively, or by multiple cuts of the punching dies per opening.

It is not critical whether the punching die or the cutting knife acts on the respective side wall for cutting the opening or the sector from the inner side, that is, starting from the area between the two side walls, or from the outside. For constructional reasons, it is substantially easier to make the punching die acting from the outside. In this case, according to a preferred embodiment, at least one abutment must be so located that in the operation of the tire, i.e. the position in which it is worked, the abutment is located between the two side walls.

As already mentioned, the material which must be pierced during the cutting operation is tough or hard and offers substantial resistance to the cutting operation. The same holds for cutting the additional openings. Accordingly, a considerable load of the drive at peak intervals are to be expected, for example, if a cut is made simultaneously with a further cut or, respectively, cutting an opening. These load peaks can be lowered if the cuts do not occur simultaneously, but at least partially sequentially that is, shifted in time. This is achieved by another embodiment of the invention where one cut in each side wall is made by means of one cutting knife which carries a cutting edge on each of two opposing sides or in a variation of the embodiment, wherein at least two punching dies are provided which are staggered with respect to each other as to its direction of motion, so that they operate sequentially, one after the other.

The abutments cooperating with the cutting knives or the punching dies may basically be flat; the cut being finished when the cutting knife with its leading edge meets the abutment. In this case, the punching die must have a sharp edge at its leading edge to take up the portion which has been punched out of the tire opening, at its front face. It is preferable however, to provide the abutments with slots or openings entered by the cutting knives or the punching dies. This substantially increases the edge life of the cutting knives or the punching dies. Preferably, the support and the abutments are replaceable and/or height adjustable thereby, making the apparatus easily adaptable to different tire sizes. To closely fit the tire on the support surface during the cutting or punching operation and to avoid tilting or moving of the tire during operation, it is suitable to round off or to square off the support surface depending on the curvature of the inner opening of the tire to be cut.

If very thick or big tires are to be cut, for example tires of trucks, tractors or the like, it may be suitable if the cut produced by at least one cutting knife extends into the tire tread. This may include a partial or complete cutting of inserts or reinforcements embedded in the material of tire tread. By doing this, the tire sectors produced from such types of tires can be comparatively easily extended after cutting, so that the strip-like extended tires can be affixed to the stand of the structure without difficulties.

The apparatus operates in such a manner that the tire is provided with openings and cuts in the tire which do not completely intersect the tire. The final (last) cut which intersects the tire completely and therefor, intersects the tire tread at one location, is mostly made by hand or, on a separate punching machine respectively. However, it is also possible to provide the inventive apparatus with an additional device comprising an additional knife which completely intersects the tire at one location and thus also the area of the tire tread. In one embodiment of the invention, the apparatus operates so that the tire is inserted into the apparatus, where upon the drive means is so actuated that the cutting knife or the cutting knives as well as the punching die or the punching dies are reciprocated, suitably staggered to operate sequentially. After finishing the so produced cuts or, openings respectively, the tire is turned relative to the stand by hand, so that the next following openings or cuts—in peripheral direction of the tire—can be made. However, within the spirit of the invention, the apparatus may also be provided with a device, for example lifting tongs, by which this turn of the tire can be made automatically.

BRIEF DESCRIPTION OF THE DRAWING

The above and other objects, features and advantages of the present invention will now be described in more detail with reference to the accompanying drawing in which:

FIG. 1 is a side view of an apparatus in accordance with the present invention, with the inserted tire being shown by way of a vertical cross section;

FIG. 2 is a front view of the apparatus seen in the direction of arrow 11 of FIG. 1, with the tire being omitted for sake of clarification;

DETAILED DESCRIPTION OF THE DRAWING

Figure 13:
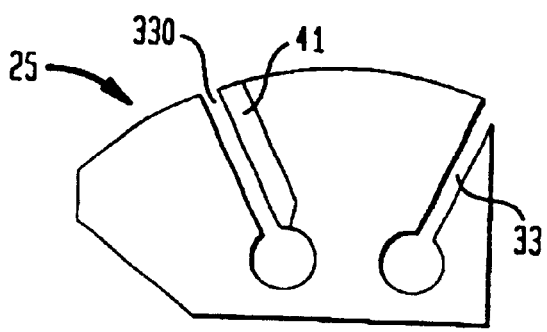
FIGS. 13 to 15 are schematic illustrations of the three guide plates showing the respective passageways.
Figure 14:
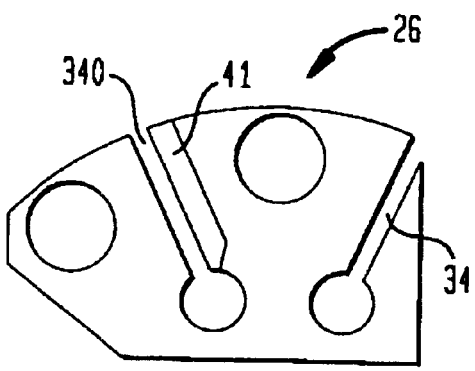
Figure 15:
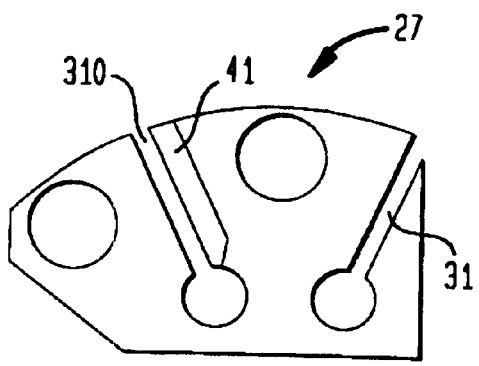

The apparatus according to FIGS. 1 and 2 includes a stand 1 with a support at its top where the tire 3 to be worked, is exchangeable fixed, for example by screwing it to the stand 1. Further, the stand 1 carries a guide mechanism 4 for two cutting knives 5 and two punching dies 6. The cutting knives 5 serve for the cutting of preferably radially extending cuts 7 in the tire 3 (FIG. 3) which cuts extend in the two side walls 9 from the inner opening 8 towards the layer of the tire tread 10 but terminate shy of the surface 11 of the tread 10. Thus, the tire 3 is divided into tire sectors 12 interconnected in the area of the tread layer 10. The punching dies 6 serve for producing holes 13 in the individual tire sectors 12. Furthermore, the stand 1 carries a drive unit 14 by which the cutting knives 5 as well as the punching dies 6 can be reciprocated in direction of double arrow 15. The drive unit 14 is suitably designed in the form of a double-acting hydraulic cylinder 16 articulated on one of its ends to a bracket 17 which is supported by a plate 18 of the stand 1, with the plate 18 resting upon posts 19. The piston rod 20 of the cylinder 16 is articulated by means of a vertical pin 21 to two lugs 22 projecting out from a plate 23 which connects the two punching dies 6 at their front ends. Further secured to the plate 23 are horizontally extending tubes 24 which carry the cutting knives 5. The punching dies 6 and the tubes 24 are guided in a guide system formed by three vertical plates 25, 26, 27, inserted into a base member 28 of the support 2 and illustrated in more detail in FIGS. 13 to 15.

The guide system is so configured that in the working position of the tire 3 (FIG. 1), the central plate 26 is disposed between the two side walls 9, and the two outer plates 25, 27 engaging at the same time the two side walls 9 from the outside. The base member 28 has a top surface 29 exhibiting a polygonally angled cross-sectional shape which follows at least substantially the shape of the periphery 30 (FIG. 3) of the tire opening 8, thereby ensuring a close fit of the tire 3 to be worked on the support 2.

Figure 9:
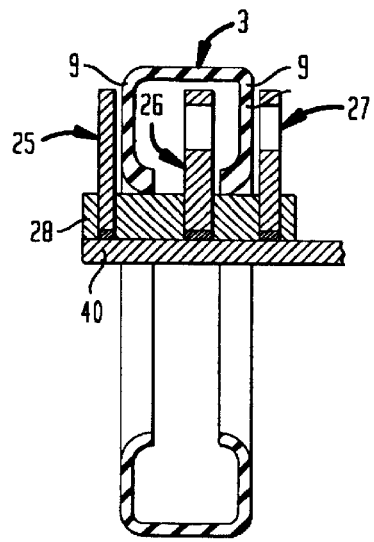
FIG. 9 is a vertical section, taken along the line IX—IX in FIG. 8.
Figure 10A:
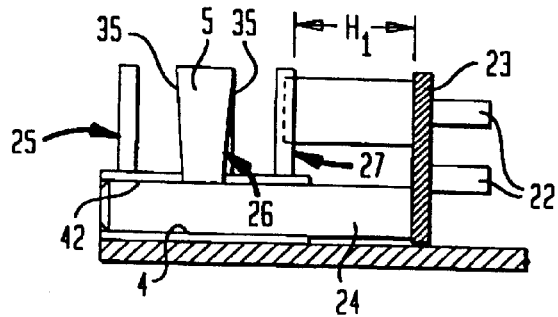
FIGS. 10a to 10d show a schematic illustration of the initial operating phase, depicting four sectional views of the apparatus from different angles taken along the lines a—a, b—b, c—c, d—d in FIG. 2.
Figure 10B:
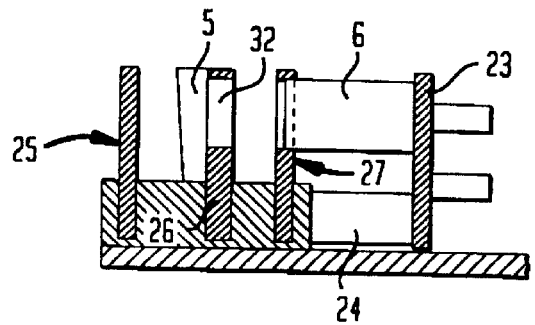

Plates 25, 26, 27 constitute abutments for the tire 3 being processed during fabrication of the cuts 7 and of the holes 13. The manner of providing the cuts 7 and the holes 13 is illustrated in FIGS. 10–12 by way of a plurality of operational steps. FIG. 10a shows the starting position (neutral position) in which the tire 3, suitably a worn or used tire, is inserted into the apparatus in a manner shown in FIGS. 6 and 7, by so lifting the tire 3 with its central opening 8 from the front side of the apparatus disposed at the left hand side in FIG. 1 over the support 2 and the guide means 4 that the two side walls (FIG. 7) are disposed on both sides of the central plate 26 of the abutment. The tire 3 is then lowered in direction of the double arrow 52 (FIG. 7) until resting upon the support 2. This position is shown in FIG. 9.

Figure 10C:
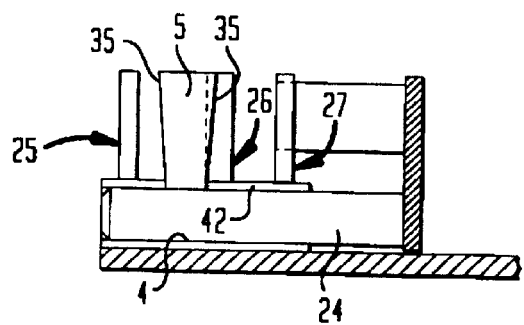
Figure 10D:
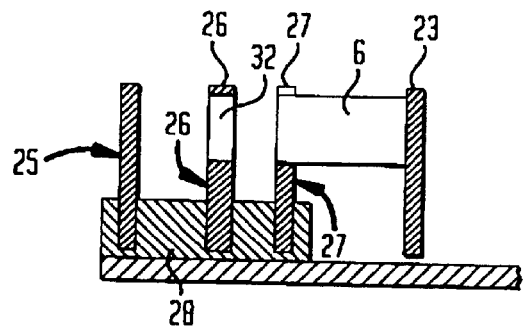

Once the tire 3 is secured in place, the double-acting cylinder 16 of the drive unit 14 is activated by an electronic control system. At first, pressurized liquid is supplied to the cylinder 16, so that the piston rod 20 is moved to the left in direction of the double-arrow 15 (FIG. 1). Thereby, the two cutting knives 5 and the two punching dies 6 are also moved towards the left, since these tools are connected, for common motion, to the piston rod 20. In the starting position, the piston rod 20 extends out of the cylinder 16 for substantially half the stroke, which stroke is marked in FIG. 10a designated by $H_1$. As is shown in FIGS. 10a and 10c, the two cutting knives 5 are mounted on the tubes 24 is in staggered disposition with respect to each other—when seen in direction of motion (arrow 15 in FIG. 1), so that the cutting knives 5 act sequentially during the cutting operation. In analogous manner, the two punching dies 6 fixed to the plate 23 are of different length, so that they act sequentially as well. In addition, the cutting knives 5 are staggered with respect to the punching dies 6 so that the cutting knives 5 and the punching dies 6 operate sequentially to thereby significantly reduce peak loads for power required during operation of the drive unit 14.

Figure 11A:
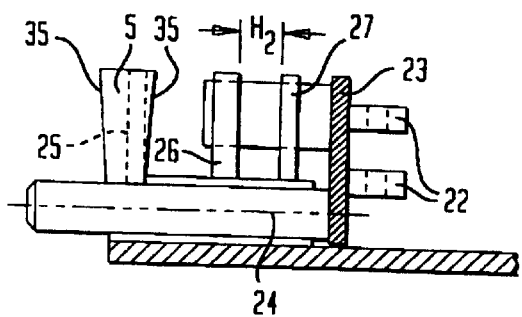
FIGS. 11a to 11d show a schematic illustration of an intermediate operating phase, depicting four sectional views of the apparatus from different angles taken along the lines a—a, b—b, c—c, d—d in FIG. 2.
Figure 11B:
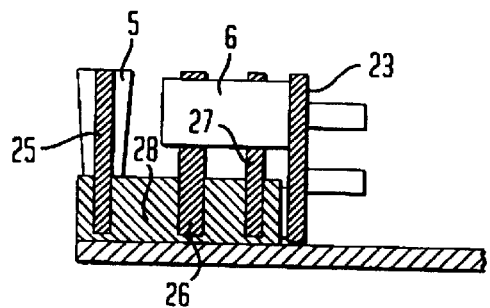
Figure 11C:
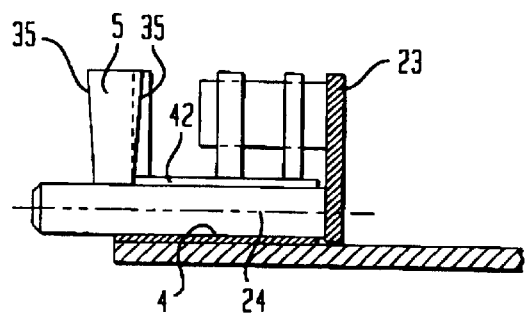
Figure 11D:
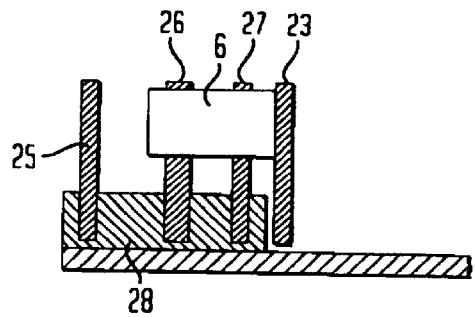

During displacement of the cutting knives 5 and the punching dies 6 towards the left (FIGS. 10a–d), these tools eventually reach the position shown in FIG. 11a, whereby the longer punching die 6 forms an hole 13 in the side wall 9 positioned on the right hand side in FIG. 1 by cutting out a side wall piece of generally circular shape from this side wall 9. This side wall piece is ejected through an opening 32 of the central plate 26, with the opening 32 exhibiting a size complementing the cross-section of the punching die 6 to enable the punching die 6 to pass through the opening 32 (FIGS. 11a–d). The other, shorter punching die 6 forms a second hole in the same side wall 9 in analogous manner and finally reaches the position shown in FIG. 11d. Subsequently, the cutting knife 5 disposed further to the left (FIG. 10c) is in operative mode and executes a cut 7 in the side wall 9 disposed to the left in FIG. 1. Finally, it reaches the position according to FIG. 11c, whereby this cutting knife 5 which was located in the starting position according to FIG. 10c in a slot 34 of the central plate 26 (FIG. 14), now enters a slot 33 of the left plate 25 (FIG. 11c). Thereby, a cut 7 in the side wall 9 disposed in FIG. 1 to the left is made. Finally, the other cutting knife 5 executes a second cut in this side wall 9 in an analogous manner and reaches the position shown in FIG. 11a. In this position, the piston rod 20 is extended to a maximum, corresponding to a minimum of the distance $H_2$. In FIG. 11a, all tools 5, 6 have reached the left hand final position.

Figure 12A:
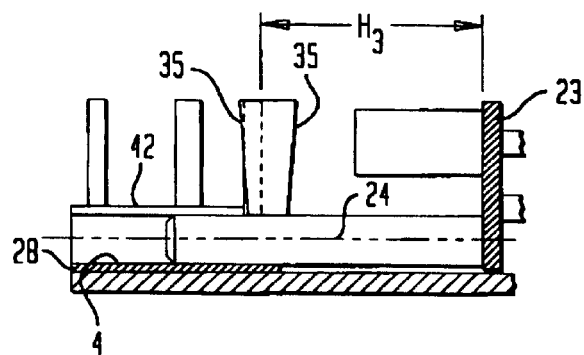
FIGS. 12a to 12d show a schematic illustration of a subsequent operating phase, depicting four sectional views of the apparatus from different angles taken along the lines a—a, b—b, c—c, d—d in FIG. 2.
Figure 12B:
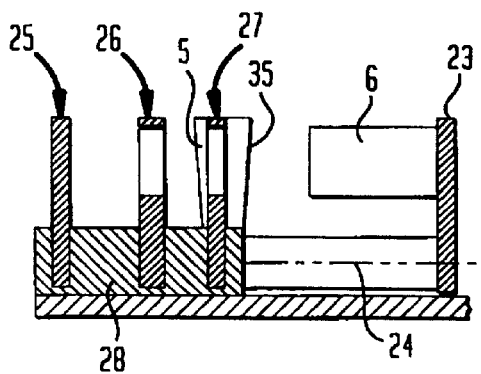
Figure 12C:
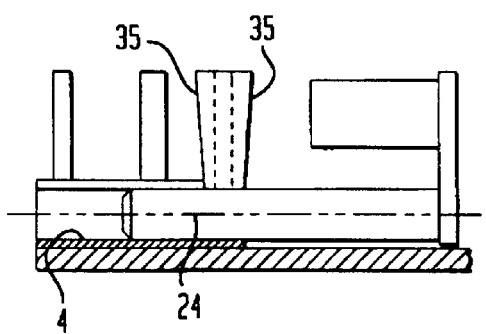
Figure 12D:
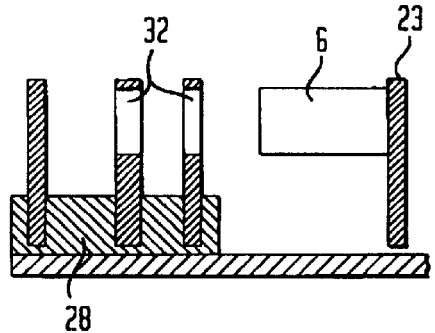

Suitably, the control of the drive unit 14 is so designed that a return motion now occurs automatically. Thus, the piston rod 20 of the cylinder 16 is retracted to thereby move the cutting knives 5 and the punching dies 6 to the right (arrow 15 in FIG. 1), so that the punching dies 6 are retracted from the openings 32 of the plates 26, 27 and reach the right end position according to FIGS. 12b or 12d respectively. The distance reaches its maximum, as indicated in FIG. 12a by reference character $H_3$. During this motion towards the right side, the punching dies 6 remain inactive. However, the cutting knives 5 cut consecutively into the side wall 9 disposed at the right side in FIG. 1, because both cutting knives 5 are provided with cutting edges 35 on opposing sides, the right plate 27 acting thereby as an abutment during the cutting operation and having formed therein slots 31 and 310 respectively (FIG. 15) for passage of the cutting knives 5.

After having performed these working steps, the tire 3 is provided on both side walls 9 with two radially extending cuts 7 and on one side wall 9 with additional holes 13 disposed between the cuts 7.

Figure 6:
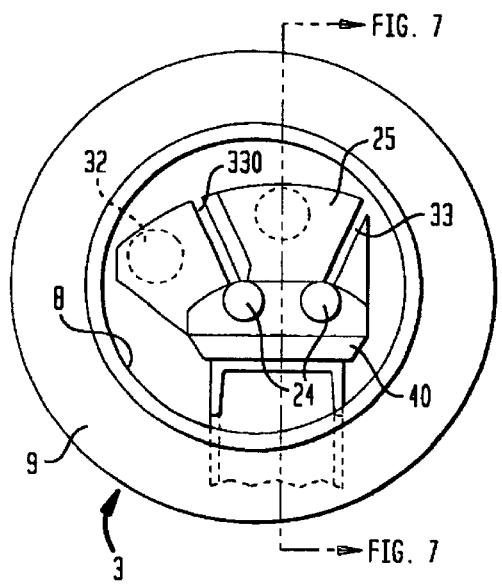
FIG. 6 is a schematic illustration of a tire inserted in the apparatus as shown in the direction of arrow 11 of FIG. 1.
Figure 8:
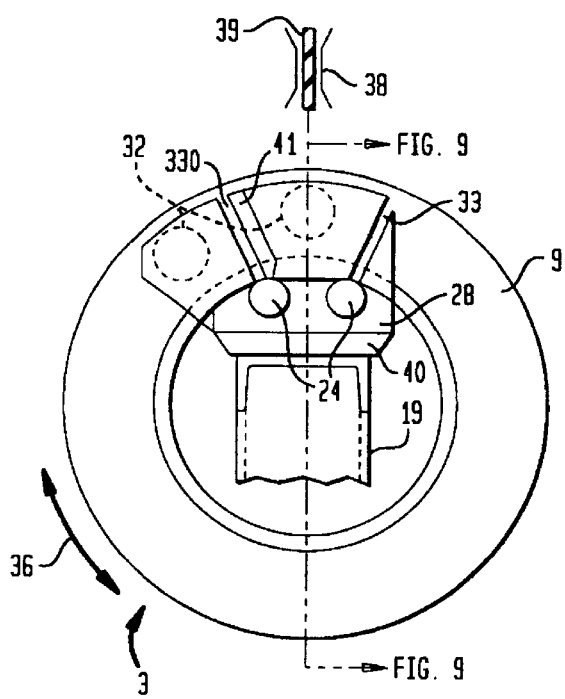
FIG. 8 is a schematic front view of the apparatus, showing a process step of turning a tire after production of two cuts and two openings prior to the next cutting or punching operation.

Subsequently, the apparatus is returned to the starting position shown in FIG. 6, so that the tire 3 can be turned about its central tire axis in one direction of the double arrow 36 (FIG. 8), so that the next cuts and holes can be provided.

Generally, it is not critical that the cuts 7 and holes 13 are evenly spaced about the circumference of the tire 3 so that a turning of the tire 3 in direction of arrow 36 can be made by eye approximation. However, if it is desired to space the cuts 7 and the holes 13 at an even distance from one another, the tire 3 is so disposed that a previously made radial cut 7 is aligned with the axis of a cutting knife 5. The aforedescribed steps are then repeated.

Figure 7:
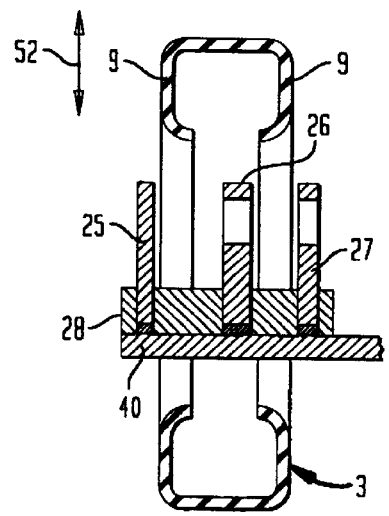
FIG. 7 is a vertical cross section, taken along the line VII—VII in FIG. 6.

After executing all radial cuts 7 and providing all desired holes 13, the tire can be removed from the apparatus in direction of the arrow 52 (FIG. 7). A final process step for extending one of the cuts 7 to completely sever the tire tread 10 and thus the tire at the respective location can be made by hand by means of a saw or in a separate punching press. This extended cut is marked by dotted lines 37 in FIG. 3. However, it is also possible to produce this cut by means of an additional device of the apparatus in the form of a separate punching knife 39 which is guided along a guidance 38 (FIG. 8) and moved in vertical direction by a drive unit (not shown).

Figure 3:
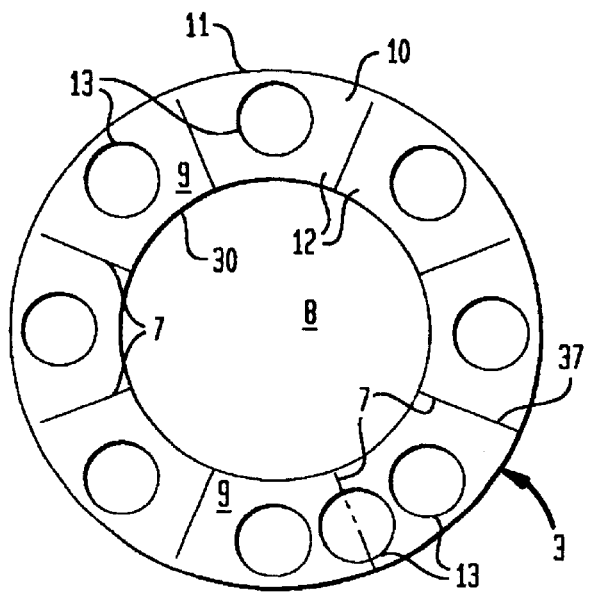
FIG. 3 is a plan view of a tire after being worked on by the apparatus according to the present invention.
Figure 4:
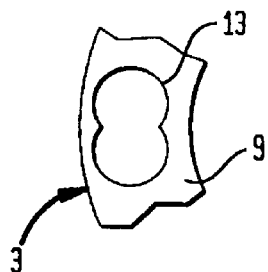
FIGS. 4 and 5 are fragmentary side views of tires formed with different configurations of openings as cut by a punch die.
Figure 5:
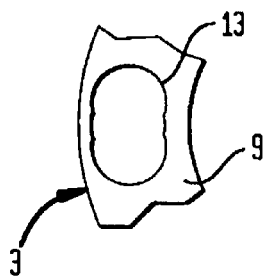

At sufficient staggered disposition of the cutting knives 5 relative to the punching dies 6, the apparatus permits also formation of holes 13 only, without executing a cut 7. This requires only control of the drive unit 14 in such a manner that only the respective punching die 6 is operational. Such an additional hole is shown in FIG. 3 and can be so disposed that it overlaps a cut 7. In an analogous manner, it is possible to obtain numerous cross-sectional shapes of the produced holes by overlapping some holes 13. Two examples for such holes are shown in FIGS. 4 and 5. For cutting the hole 13 according to FIG. 4, two operations of the punching die are required, and for the hole 13 shown in FIG. 5, three operations of the punching die are required.

The relative position of the holes on the side wall 8 can be varied by vertical adjustment of the support 2, while the disposition of the tools 5, 6 and their guide unit 4 remains unchanged. In order to change from one tire size to a different tire size without any problem, it is suitable to provide a plurality of sets of supports 2 with associated tools 5, 6 which are exchangeable against each other. This exchange is easily possible by loosening the pin 21 and by screwing off a plate 40 carrying the support 2 from the stand 1. The various kits are then matched to the desired tire sizes.

The working edges of the cutting knives 5, the slots 33 and 330, 34 and 340, 31 and 310 respectively in the plates 25, 26, 27 (FIG. 13–FIG. 15) cooperating with the cutting knives, as well as the working edges of the punching dies 6 and of the opening 32 cooperating with them, may at least partially made of hard material in order to obtain a longest possible service life. Furthermore, it is advantageous to slightly incline the cutting edges of the cutting knives 5 with respect to the vertical direction. This results in a drawing cut of the cutting knives 5.

As mentioned before, cutting of numerous small holes in the side walls 9 may be effected by punching dies which includes numerous small piercing plugs in side-by-side disposition and cooperating with complementary openings in the plates 25, 26, 27.

Optionally, the holes 13 may be cut also in the other side wall 9, by taking the tire 3 off the apparatus after execution of the described operation steps, and turning the tire by 180 degrees, so that now the other side wall 9 cooperates with the punching dies 6. The desired holes in the other side wall 9 can be produced also by limiting the corresponding stroke of the punching dies 6. Alternatively, it is also possible to lengthen the punching dies 6 to enable their use for cutting the other side wall. For that purpose, the plate 25 shown to the left in FIG. 1 must simply be provided with openings suitable for the penetration of the punching dies 6. The same is true for the above mentioned piercing plugs for cutting of numerous small holes.

In types of tires having very strong reinforcements or inserts embedded into the side wall bead, it may be suitable first to cut these beads before the tires are placed into the apparatus to reduce the power consumption.

In general, it is suitable to provide a common drive system 14 for the cutting knives 5 and the punching dies 6. In some cases, however, it may be advantageous to provide separate drive systems for the cutting knives 5 and the punching dies 6, whereby the separate drive systems can be supported together by the stand.

It may be advantageous to reinforce the plates 25, 26, 27 by additional plates 41 (FIG. 2) in the area of the slots 33 entered by the cutting knives 5.

Suitably, the tubes 24 have a circular cross-section. However, the two cutting knives 5 cannot turn about the tube axis because on the one hand, the two tubes 24 are commonly fixed into the plate 23, and on the other hand, the cutting knives 5 are guided in longitudinal slots 42 (FIG. 10c) of the guide mechanism 4. For larger tires which may have a considerable weight, it is advantageous to provide lifting tongs, by which the tire can be placed into or removed from the apparatus. Such a device can also be used for turning the tire in the apparatus in the direction of the double arrow 36.

It should be understood that the apparatus may include more than two cutting knives 5 or punching dies 6, respectively.

What is claimed is:

1. Apparatus for making tire sectors from a tire, interconnected at a tire tread, said apparatus comprising;
   a stand;
   a support mounted to the stand and adapted for receiving the tire having opposite side walls;
   at least one cutting knife having opposite sides and configured with cutting blades;
   a drive operatively connected to the cutting for reciprocating the cutting knife in a path of displacement from a mid-position and opposite end positions for so executing a cut in each side wall from an inner opening of the tire such that the cutting knife cuts the side wall of the tire without reaching the tread; wherein said support has guide means having at least two spaced apart and arc-shaped abutments extending vertically and perpendicularly to the path of displacement of the cutting knife for supporting each side wall of the tire, said abutments include multiple passageways to allow passage of the cutting blades of the cutting knife through the abutments during displacement of the cutting knife.

2. The apparatus of claim 1, wherein the cutting knife has opposite sides, with each side having a blade for cutting the side walls.

3. The apparatus of claim 1 wherein the passageways in the guide means are formed with slots.

4. The apparatus of claim 1 wherein the drive is a double-acting pressure fluid cylinder.

5. The apparatus of claim 1 wherein at least one element selected from the group consisting of support, guide means, cutting unit and punch unit is adjustable in height.

6. The apparatus of claim 1 wherein said support is configured to complement a curvature of the tire's inner opening.

7. The apparatus of claim 1, wherein the drive is mounted to the stand.

8. The apparatus of claim 1 wherein the cutting unit has a second cutting knife for executing a cut which extends to the tread of the tire.

9. The apparatus of claim 1, further comprising a cutting knife for severing the tire tread.

10. The apparatus of claim 1, and further comprising a punch unit for making holes in each side wall of the tire.

11. The apparatus of claim 1, further comprising a second cutting knife, with one of the cutting knives having a blade facing one side wall of the tire and the other one of the cutting knives having a blade facing the other side wall of the tire.

12. The apparatus of claim 11 wherein at least one of the cutting knives is formed with at least one inclined cutting edge.

13. The apparatus of claim 1 wherein the support includes a tube for attachment of the cutting knife, said tube being guided in the guide means for movement in a longitudinal direction and operatively connected to the drive.

14. The apparatus of claim 13 wherein the cutting knife has two cutting knives, and the support has a cross member for retaining two such tubes, with one of the tubes carrying one cutting knife and the other one of the tubes carrying the other cutting knife, said cross member being operatively to the drive.

15. The apparatus of claim 1, and further comprising a punch unit including a punching die movable between an idle position and an operative position in which a hole is formed in one of the side walls, said punching die is guided through the guide means during movement between the idle position and the operative position, with said guide means forming a third abutment positioned between the side walls of the tire and formed with a passageway for passage of the punching die, wherein at least one of the at least two spaced apart abutments being formed with a passageway for passage of the punching die in addition to the passageways for passage of the cutting knife.

16. The apparatus of claim 15 wherein the drive is operatively connected to the punching unit for moving the punching die between the idle and operative positions.

17. The apparatus of claim 15 wherein two cutting knives are provided for cutting the tire walls, and the punching unit includes two punching dies, said punching dies being disposed in staggered position relative to one another in a direction of displacement and said cutting knives being disposed in staggered position relative to one another in the direction of displacement.

18. The apparatus of claim 15, a wherein at least one element selected from the group consisting of the support, the guide means, the cutting knife and the punch unit is exchangeable.

19. The apparatus of claim 15 wherein the punching unit includes two punching dies and two cutting knives are provided, said cutting knives and said punching dies being spaced in alternating sequence about the perimeter of the tire and in staggered disposition.

20. The apparatus of claim 19 wherein the cutting knives and the punching dies are evenly spaced from one another.

* * * * *